United States Patent

[11] 3,580,119

[72] Inventor Geoffrey Frank Witherington-Perkins
    Redditch, England
[21] Appl. No. 795,579
[22] Filed Jan. 31, 1969
[45] Patented May 25, 1971
[73] Assignee Triplex Safety Glass Company Limited
    London, England
[32] Priority Jan. 31, 1968
[33] Great Britain
[31] 4,902/68

[54] MAINTAINING SHEETS OF GLASS IN MUTUALLY SPACED RELATIONSHIP WHEN STACKED TOGETHER FOR TRANSPORT OR STORAGE
6 Claims, 10 Drawing Figs.
[52] U.S. Cl. .................................................. 83/23,
    83/205, 83/229, 83/701, 156/522
[51] Int. Cl. ...................................................... B26d 5/22
[50] Field of Search .......................................... 156/522;
    270/58; 271/7; 53/66, 67, 157; 83/203, 205, 229,
    23, 701

[56] References Cited
UNITED STATES PATENTS

| | | | |
|---|---|---|---|
| 2,203,977 | 6/1940 | Bennett | 156/522X |
| 2,285,921 | 6/1942 | Grein et al. | 271/7X |
| 2,495,003 | 1/1950 | Haas | 156/522X |
| 2,776,068 | 1/1957 | Johnson | 156/522X |
| 3,466,843 | 9/1969 | Mumper | 156/522X |

Primary Examiner—James M. Meister
Attorney—Scrivener, Parker, Scrivener and Clarke ABSTRACT: A method and apparatus for maintaining sheets of glass in mutually spaced relation when stacked together. Flexible strip material is fed to a severing machine wherein strips are cut to length. Thereafter the cut strips are applied to sheets of glass before the glass sheets are stacked together. One face of the strip material is smoother than the other face whereby the smoother face tends to adhere to the glass more strongly than the less smooth face.

MAINTAINING SHEETS OF GLASS IN MUTUALLY SPACED RELATIONSHIP WHEN STACKED TOGETHER FOR TRANSPORT OR STORAGE

This invention concerns a method of and means for maintaining sheets of glass in mutually spaced relationship when stacked together for transport or storage. Hitherto it has been customary to interleave sheets of glass with sheets of paper, but this results in the use of large quantities of paper which is expensive and awkward to dispose of after use, and it also requires considerable manual labor both during stacking and during unstacking.

It has been proposed to use inserts of rubber or other resilient material as separators to maintain the sheets of glass in the desired relationship. Such inserts could well be less bulky and less costly than sheets of paper, and the present invention is particularly concerned with inserts of this kind.

From one aspect the present invention consists in a method of maintaining sheets of glass in mutually spaced relationship when stacked together, in which method lengths of flexible strip material are severed from a stock of strip material as they are required for use and are applied at spaced positions to at least one surface of each of a plurality of sheets of glass, the sheets then being incorporated in a stack of sheets of glass, so that the lengths of strip material maintain the sheets of glass constituting the stack in mutually spaced relationship.

Each length of strip material is preferably fed from where it is severed to where it is applied to a sheet of glass along a substantially predetermined path, and conveniently each length of strip material is applied to a sheet of glass closely adjacent to the place where it is severed from the stock of strip material.

From another aspect the present invention consists in apparatus for applying to sheets of glass lengths of strip material for maintaining the sheets in mutually spaced relationship when the sheets are subsequently stacked together, which apparatus comprises means for locating a sheet of glass, means for supporting a stock of flexible strip material, means for severing short lengths of strip material from the stock, and means for applying the severed lengths of strip material to the glass at predetermined positions.

The severed lengths of strip material may be applied to the sheets of glass while the sheets are stationary, but in a preferred arrangement the lengths are applied while the sheets are moving, and the severing of the lengths and their application to each sheet of glass are preferably instituted in response to the arrival of the sheet at a predetermined position.

It is to be understood that the apparatus can be used for applying lengths of strip material to sheets of glass which are curved as well as to flat sheets.

The lengths of strip material may be applied to both sides of alternate sheets in a stack, but are preferably applied to one side only of each sheet.

Each length of strip material is preferably such that in use, when sandwiched between two adjacent sheets of glass it adheres to one sheet only or adheres more strongly to one sheet than to the other so that when the sheets are subsequently separated it adheres to said one sheet. In this way it is possible, for example, to ensure that lengths of strip adhere to the outer surfaces of vehicle body lights (i.e. windows), the lengths of strip being removed only after the lights have been installed in vehicles.

The invention will now be more particularly described with reference to the accompanying drawings, in which.

The apparatus illustrated serves to apply to each of a plurality of successive sheets of glass five lengths of strip material in a quincuncial arrangement. The lengths of strip material are severed from rolls of strip material by strip application devices which also act to apply the severed lengths to the glass. There are 10 such devices, and as all of them are similar to one another only one is described and illustrated in detail.

The device is intended for use with strip material made from polyvinyl chloride. The material has a shiny surface on one side and a matt surface on the other. When a length of such strip material is pressed to a sheet of glass it is found that the shiny surface adheres quite strongly to the glass while the matt surface adheres scarcely at all. In a typical arrangement the strip material is three-quarters of an inch wide and 0.016 inches thick. Each length severed is between 1½ and 2 inches long. A stock of the strip material, in the form of a roll, is mounted in association with the device as described below with reference to FIG. 7.

Figure 1:
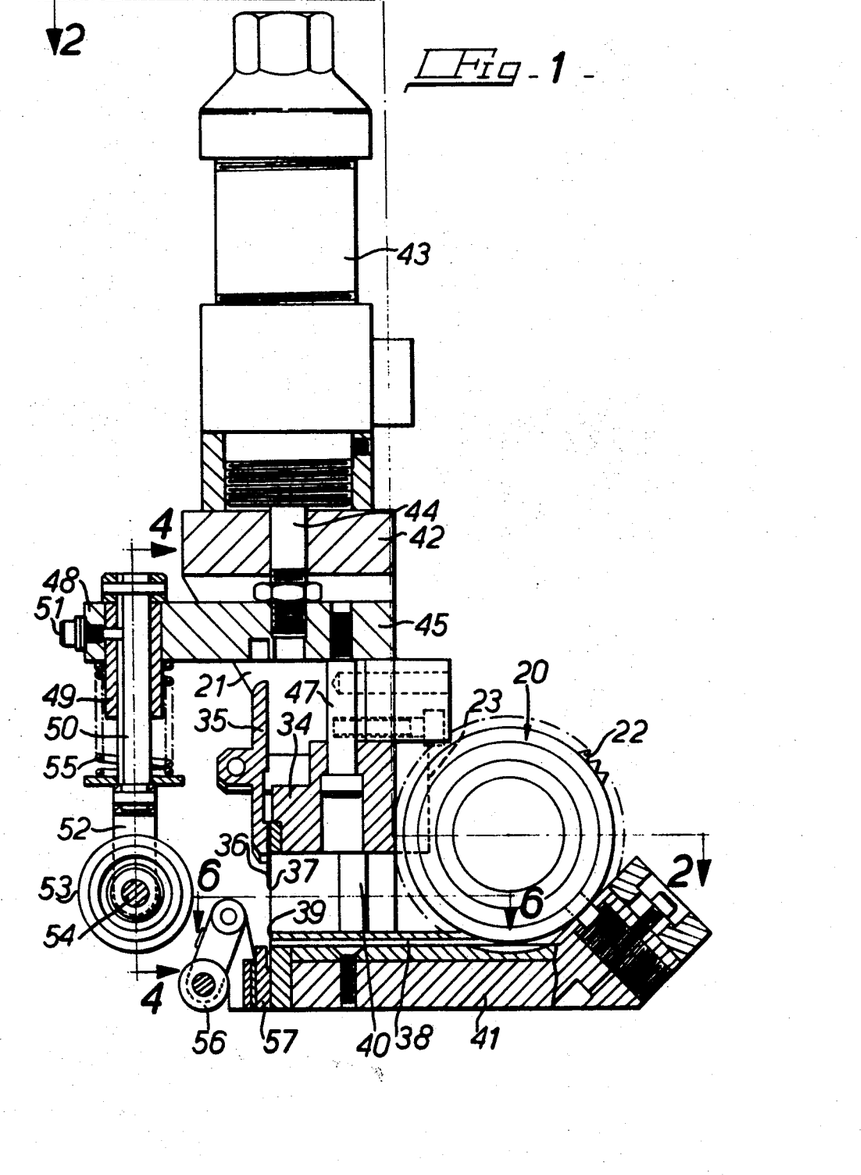
FIG. 1 is a side view of a strip application device incorporated in the invention, sectioned along the line 1-1 of FIG. 2.
Figure 2:
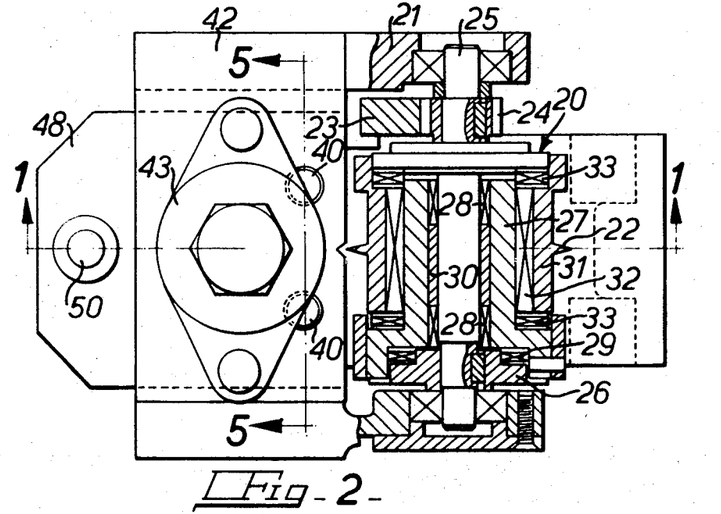
FIG. 2 is a plan view of the device shown in FIG. 1, sectioned along the line 2-2 of FIG. 1.
Figure 3:
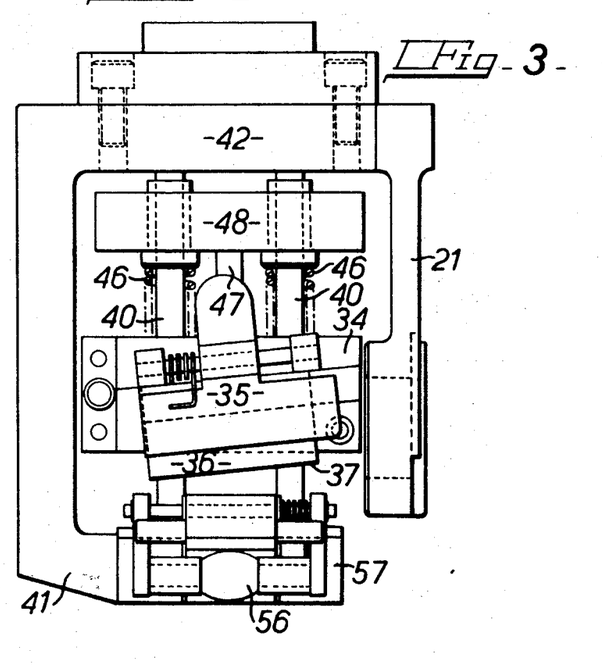
FIG. 3 is a front view of the lower part of the device as viewed from the left of FIG. 1, certain parts being omitted to reveal others.
Figure 4:
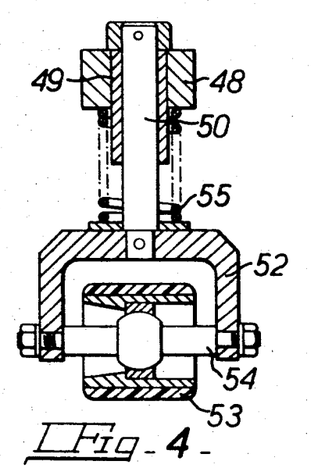
FIG. 4 is a section along the line 4-4 of FIG. 1.
Figure 5:
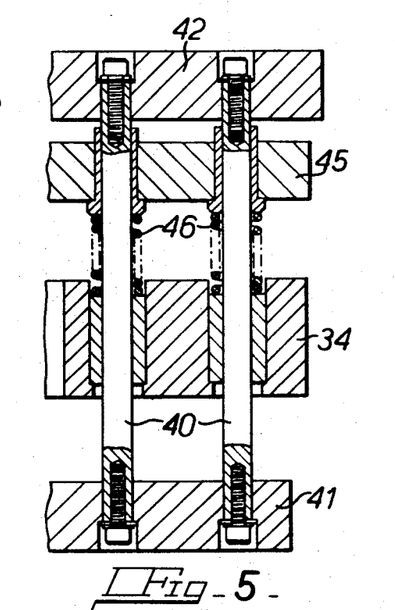
FIG. 5 is a section along the line 5-5 of FIG. 2.
Figure 6:
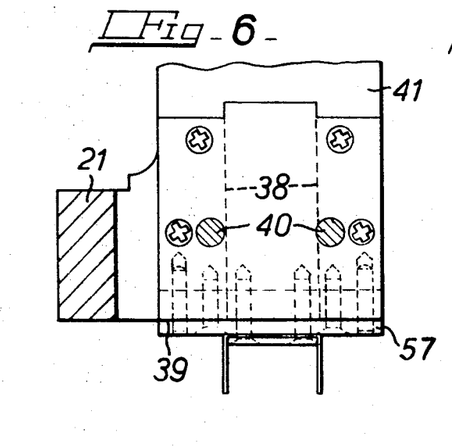
FIG. 6 is a section along the line 6-6 of FIG. 1.

The strip material extends almost vertically downwards to the strip application device and passes round and beneath a feeding drum 20 forming part of the device and mounted for rotation about a horizontal axis on the frame 21 of the device. The feeding drum 20 has at its center a peripheral ring of radially projecting spikes 22 operative to engage the strip material and to cause the material to move positively forward when the drum is rotated. Rotation of the drum 20 is effected by reciprocation of a vertically extending rack 23 which cooperates with a pinion 24 coaxial with the drum. The pinion 24 is keyed to a spindle 25 which carries the drum 20. The drum 20 is of composite construction; one end is constituted by a plate 26 also keyed to the spindle 25 and the other end is constituted by an integral flange on the spindle. An inner part of the drum 20 is constituted by a sleeve 27 on the spindle 25. Needle bearings 28 act between the cylindrical outer surface of the spindle 25 and the bore of the sleeve 27. The bore is shaped with arcuate recesses in which the needle bearings 28 are housed, the arrangement being such that when the spindle 25 is rotated in either direction the needle bearings 28 first move to the ends of their recesses and then carry the sleeve 27 with them. Thus backlash is introduced. The sleeve 27 is located by bearings 29 and a collar 30 on the spindle 25. The outer part of the drum 20 is constituted by a sleeve 31, which carries the spikes 22. Needle bearings 32 act between the cylindrical outer surface of the inner sleeve 27 and the bore of the outer sleeve 31. The bore is shaped with recesses which are of sawtooth shape in cross section. The needle bearings 32 are housed in these recesses, so that a one-way clutch is thus formed. The outer sleeve 31 is located by bearings 33. The arrangement is such that when the rack 23 is lowered the sleeve 31 remains stationary, and when the rack 23 is subsequently raised the sleeve 31 still remains stationary during the initial stages of upward movement of the rack, due to the operations of the backlash device described above, but is positively rotated during the remaining upward movement of the rack.

The rack 23 is mounted at the rear of a vertically reciprocable block 34, the front of which carries a knife blade holder 35 and a knife blade 36 with its cutting edge 37 directed downwards and inclined somewhat to the horizontal. The strip material leaving the feeding drum 20 passes through a horizontal extending slot 38 in the bottom part of the frame 21 of the device the slot being sufficiently wide to receive and locate the strip, and terminating at a vertically extending face 39. The arrangement is such that as the block 34 is lowered the blade 36 slides over this face 39 and cuts any part of the strip material projecting from the slot 38.

The block 34 is mounted for vertical movement on a pair of vertical pillars 40 which extend between the bottom 41 of the frame 21 and the top 42 of the frame. A pneumatic piston-and-cylinder unit 43 is mounted on the top 42 of the frame 21 and extends upwards from the frame with its axis vertical. The piston rod 44 of the unit 43 projects from the lower end of the unit, through the top 42 of the frame, and is connected to a horizontal plate 45 slidably mounted on the pillars 40, above the block 34. Helical compression springs 46 on the pillars 40 act between the plate 45 and the block 34 to urge the latter downwards. A headed pin 47 projects downwards from the plate 45 and passes through a hole in the block 34. The arrangement is such that when the piston of the unit 42 is lowered the springs 46 push the block 34 downwards and the knife blade 36 severs any protruding strip material, and when the piston is raised the head of the pin 47 engages a shoulder on the block 34 and raises it again. The arrangement is also such that due to the backlash device in the drum 20 further forward feeding movement of the strip material is delayed until the knife blade 36 is clear of the end of the slot 38 through which the strip material passes.

The plate 45 has a forward extension 48 formed with a hole in which there is fixed a sleeve 49 through which extends a rod 50 having a head pinned to its upper end. The rod 50 can slide vertically but is restrained from rotation by a pin 51 in the extension 48 which pin locates the sleeve 49 and enters a keyway in the rod 50. A forked carrier 52 is secured to the lower end of the rod 50, and a roller 53 is mounted on a horizontal spindle 54 extending between the tines of the fork. A helical compression spring 55 around the rod 50 acts between the underside of the plate extension 48 and the top of the carrier 52 to urge the carrier downwards. The roller 53 is mounted for rotation about the axis of the spindle 54, but can be tilted so that its own axis is not always coincident with the axis of the spindle.

In use, when the plate 45 is in its uppermost position (as shown in FIG. 1) a length of strip material normally projects from the slot 38, and this length of strip material extends immediately beneath the roller 53. As the plate 45 is lowered by the piston-and-cylinder unit 43 the end of the length of strip material which extends from the slot, is pushed downwards beneath the roller 53 towards a sheet of glass while the sheet moves beneath the device. The projecting strip material is severed by the knife blade 36. As the plate 45 reaches the lowest part of its travel the compression spring 55 acts to press the roller 53 against the severed length of strip material on the glass, and thereby causes the strip material to adhere to the surface of the glass. If the glass is curved the roller 53 tilts to accommodate the camber.

In order to guide the projecting length of strip material before it is applied to the glass an additional roller 56 is provided between the end of the slot 38 and the movable roller 53. The roller 56 is so mounted that its position can be adjusted. Further, in order to support the projecting length of strip material as it is severed a narrow support plate 57 is mounted in front of the vertically extending face 39 at the front end of the slot 38, the arrangement being such that the knife blade 36 can just enter the gap between said vertically extending face 39 and the support plate 57, the top of the support plate being level with the bottom of the slot.

Figure 7:
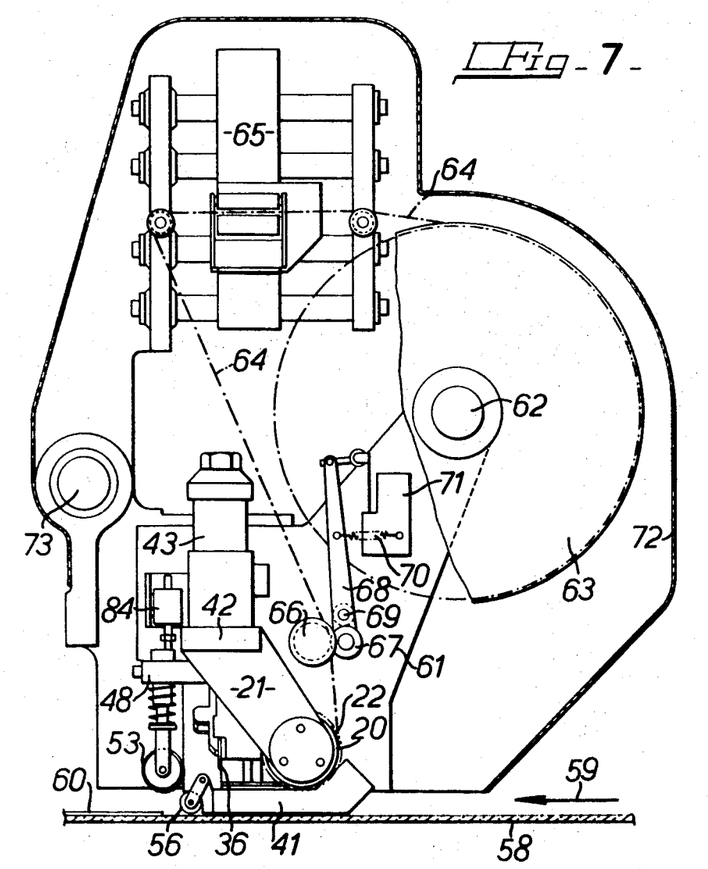
FIG. 7 is a side view, to a smaller scale, of a head embodying a device of the kind illustrated in FIGS. 1 to 6, the casing being sectioned to reveal the interior.
Figure 8:
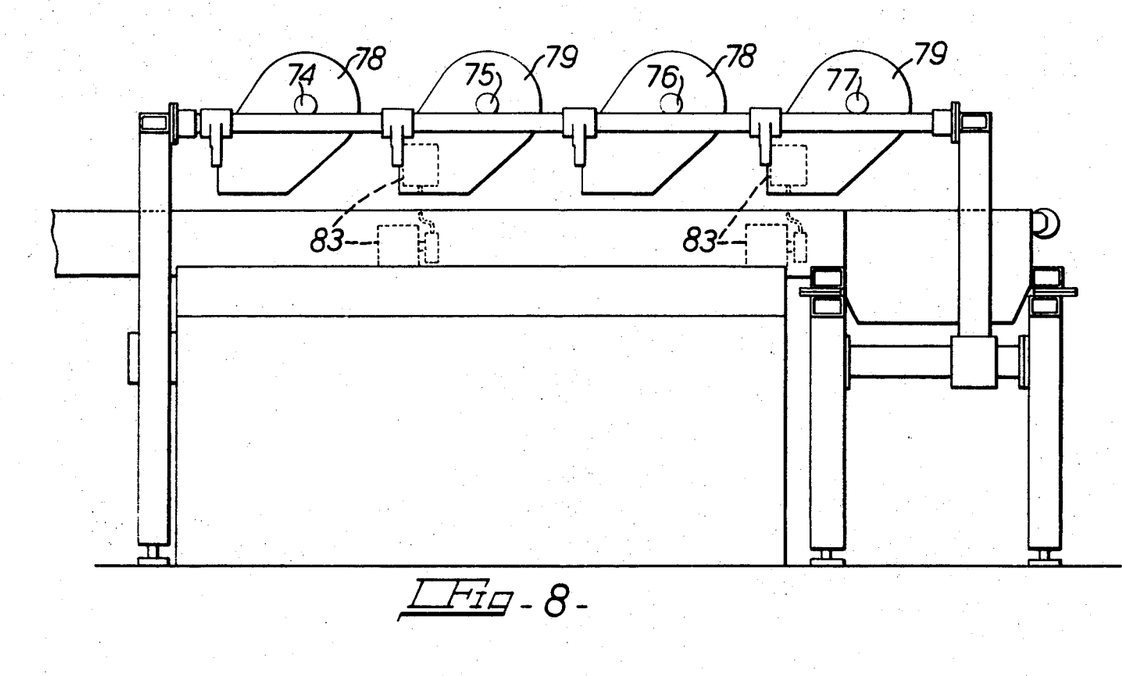
FIG. 8 is a side view, to a still smaller scale of apparatus embodying 10 heads of the kind shown in FIG. 7.
Figure 9:
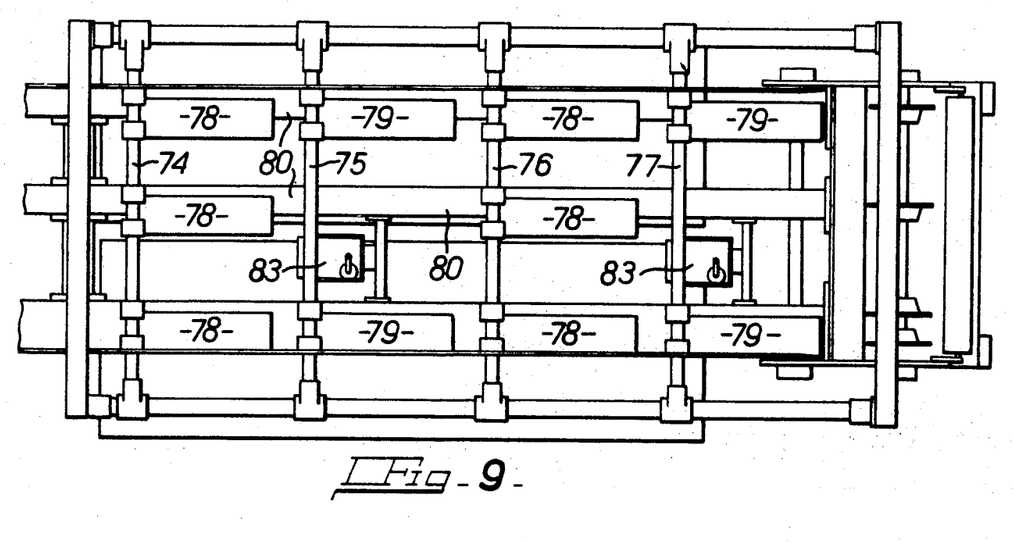
FIG. 9 is a plan view of the apparatus shown in FIG. 8.
Figure 10:
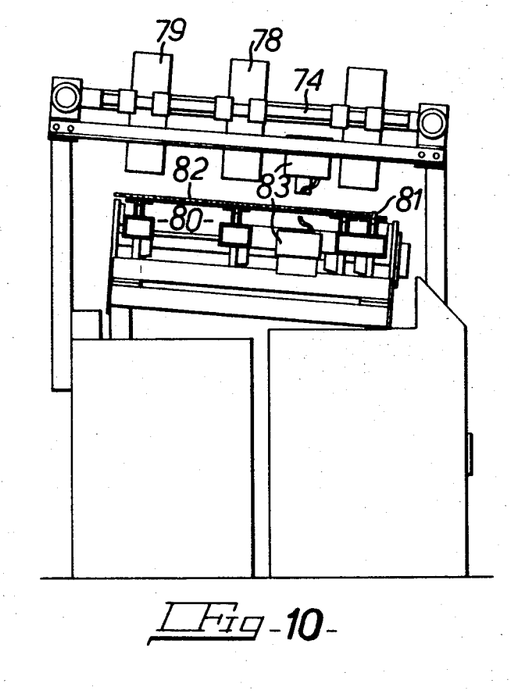
FIG. 10 is an end view, partly sectioned, of the apparatus shown in FIG. 8 and viewed from the left of FIG. 8.

FIG. 7 shows a device of the kind described above mounted in a head which is in turn mounted above a conveyor for sheets of glass. The conveyor is described below and is illustrated in FIGS. 8 to 10. Although the conveyor is not shown in FIG. 7, this Figure does include a sheet of glass 58 which moves in the direction of the arrow 59 and has just received a length of strip material 60 from the device.

The head includes a body 61 supporting a spindle 62 which carries a roll 63 of strip material 64. The material passes from the roll 63 through a printing device 65 which is intermittently operable to print information on the material. The information may be of a trademark nature and/or may be varied and so serve to identify the particular batch of glass sheets to which the material 64 is applied, the date, the quality, or other details. The arrangement is preferably such that each severed length of strip material 64 carries each item of information once only, and the printing device 65 may be arranged to operate in synchronism with the strip application device. As the printing device 65 forms no part of the present invention it will not be described in detail.

The strip material 64 passes downwards from the printing device between two freely rotatable rollers 66 and 67. The axis of the roller 66 is fixed relatively to the body 61, while the axis of the other roller 67, is movable, the roller being mounted on the shorter arm of a two armed lever 68 pivotally secured at 69 to the body 61 of the head. A tension spring 70 acts between the body 61 of the head and the longer arm of the lever 68 so as to urge the roller 67 towards the roller 66. The end of the longer arm of the lever 68 is connected to the operating arm of a microswitch 71 and the arrangement is such that when the strip material 64 extends between the rollers 66 and 67 the microswitch 71 is not operated, but if there is no strip material between the rollers the microswitch is operated.

The strip application device is mounted on the body 61 in such a manner that its vertical position can be adjusted. The head has a casing 72 which can be opened to enable fresh rolls of strip material to be placed on the spindle 62. The body 61 is formed with a horizontal transverse hole 73 for receiving a horizontal support rod. The head can be locked in any desired position on the rod. As shown in FIGS. 8 and 9 the apparatus includes four parallel support rods 74 to 77, and there are three heads 78 on each of the rods 74 and 76, and two heads 79 on each of the rods 75 and 77. The rods 74 to 77 extend transversely above the upper run of an endless belt conveyor 80 which is driven by an electric motor through suitable reduction gearing (not shown). The rods 74 to 77 and the conveyor 80 are inclined slightly to the horizontal (as best seen in FIG. 10) and the conveyor has an upstanding rib or flange 81 along its lower edge which assists in locating the sheets of glass one of which is shown at 82. This inclination is not essential, however, and the conveyor may be truly horizontal if desired.

In use sheets of glass are placed one by one on the conveyor 80, with their edges against the rib or flange 81 and pass beneath the heads 78 and 79. When any sheet of glass reaches a predetermined position its leading edge breaks the ultrasonic beams of one of a pair of detector devices 83, and the interruption of the beam starts a timer which delays the operation of the heads until the glass is in the correct position. When a head 78 or 79 operates pressurized air is introduced into its pneumatic piston-and-cylinder unit 43 and a length of strip material is severed and applied to the glass as described above. The movement of the plate 45 trips a switch 84 (see FIG. 7) which after a predetermined time delay causes the admission of pressurized air to the pneumatic piston-and-cylinder unit 43 to reverse the movement and return the device to its initial position to await the arrival of the next sheet of glass.

During normal operation of the apparatus only five of the heads 78 and 79 are operative, these being on two only of the rods 74 to 77, and these are controlled by one of the detector devices 83. If the roll 63 of strip material in any of the operative heads becomes exhausted the appropriate microswitch 71 is operated, and this automatically causes the other set of five heads, controlled by the other detector device 83, to come into operation in place of the former set of heads with their detector device. The apparatus can thus continue to operate while a fresh roll of strip material is inserted into the head from which the previous roll was exhausted.

After the lengths of strip material have been applied to the sheets of glass the sheets are stacked together, and there may, for example, be from 200 to 300 sheets in a single stack.

I claim:

1. Apparatus for applying to sheets of glass lengths of strip material for maintaining the sheets in mutually spaced relationship when the sheets are subsequently stacked together, which apparatus comprises means for locating a sheet of glass adjacent to a strip application station, and means for supporting a stock of flexible strip material, reciprocable means, cutting means operative on one stroke of the reciprocable means to sever a short length of strip material from the stock, feed mechanism operative on the other stroke of the reciprocable means to cause the end portion of the stock of strip to be so positioned relatively to the cutting means that it is severed by the cutting means on the next stroke of the reciprocating means, and means at the strip application station for applying a severed length of strip material to each in turn of a plurality of sheets of glass while such sheet is located by the locating means adjacent to the strip application station.

2. Apparatus according to claim 1 in which the means for applying the severed lengths of strip material to the sheets of glass comprises a rotatable member urged to press the lengths onto the sheets and so mounted that its axis of rotation can tilt to accommodate variations in angle of the sheets as they pass the strip applying station.

3. Apparatus according to claim 1 in which there are two alternative strip application means each with detector means operative to detect when its stock of strip material is substantially exhausted, control means being provided for bringing either strip application means into operation when the detector means of the other becomes operative.

4. Apparatus according to claim 1 in combination with a stock of nonadhesive strip material having one face smooth and the other less smooth so that, when a length of the material is trapped between two sheets of glass in a stack, the smoother face of the material tends to adhere to the adjacent sheet of glass more strongly than the less smooth face.

5. Apparatus according to claim 1 in which the cutting means comprises a reciprocable blade which on one stroke of the reciprocable means crosses the path of the strip material to sever any strip material in said path and on the other stroke is withdrawn from said path, means being provided to delay the operation of said feed mechanism during said other stroke until the blade is clear of said path.

6. A method of maintaining sheets of glass in mutually spaced relationship when stacked together comprising the steps of causing sheets of glass successively to pass an application station, severing short lengths of strip material from a stock of such material as the sheets of glass pass said station the strip material being flexible, nonadhesive and with one face smooth and the other face less smooth, applying said short lengths of strip material at the application station with their smoother sides against the glass, and stacking the sheets of glass with the short lengths of material serving to maintain them in mutually spaced relationship.